(12) United States Patent
Hagio et al.

(10) Patent No.: US 6,407,543 B1
(45) Date of Patent: Jun. 18, 2002

(54) ROTATION ANGLE DETECTOR HAVING FIRST MOLDED MEMBER INTEGRATING MAGNETIC SENSING ELEMENT AND OUTPUT TERMINAL AND SECOND MOLDED MEMBER INTEGRATING STATOR CORE AND FIRST MOLDED MEMBER

(75) Inventors: Hirofumi Hagio, Handa; Takashi Hamaoka, Kariya; Yoshiyuki Kono, Obu; Takamitsu Kubota, Kariya; Tomokazu Kondo, Okazaki, all of (JP)

(73) Assignee: Denso Corporation (JP)

(*) Notice: Subject to any disclaimer, the term of this patent is extended or adjusted under 35 U.S.C. 154(b) by 0 days.

(21) Appl. No.: 09/689,634

(22) Filed: Oct. 13, 2000

(30) Foreign Application Priority Data

| | | |
|---|---|---|
| Nov. 1, 1999 | (JP) | ................................ 11-311126 |
| Jan. 31, 2000 | (JP) | ................................ 2000-022529 |
| May 19, 2000 | (JP) | ................................ 2000-147238 |

(51) Int. Cl.$^7$ ............................... G01B 7/30; F02P 7/07
(52) U.S. Cl. ............................... 324/207.25; 324/207.2; 123/617
(58) Field of Search .................... 324/207.2, 207.21, 324/207.25, 174, 207.15, 207.16; 336/234, 96; 123/617

(56) References Cited

U.S. PATENT DOCUMENTS

| | | | | |
|---|---|---|---|---|
| 5,444,369 A | * | 8/1995 | Luetzow | .................. 324/207.2 |
| 5,698,778 A | * | 12/1997 | Ban et al. | .................. 73/118.1 |
| 5,757,179 A | * | 5/1998 | McCurley et al. | ....... 324/207.2 |
| 5,789,917 A | * | 8/1998 | Oudet et al. | ............. 324/207.2 |

FOREIGN PATENT DOCUMENTS

| | | |
|---|---|---|
| JP | 62-182449 | 8/1987 |
| JP | 2-130403 | 5/1990 |
| JP | 8-68606 | 3/1996 |

* cited by examiner

*Primary Examiner*—Edward Lefkowitz
*Assistant Examiner*—Reena Aurora
(74) *Attorney, Agent, or Firm*—Nixon & Vanderhye PC

(57) ABSTRACT

Non-contact type Hall ICs detecting an rotation angle of a throttle valve, a stator core strengthening a magnetic field around the Hall ICs, a lead frame connecting the Hall ICs to an outside ECU are integrated in a sensor cover by resin molding. Thus, the Hall ICs, the stator core, and the lead frame are accurately positioned in the sensor cover. As a result, the Hall ICs are accurately positioned with respect to a permanent magnet disposed in a shaft side of the throttle valve, thereby improving an accuracy of detecting the rotation angle of the throttle valve.

6 Claims, 14 Drawing Sheets

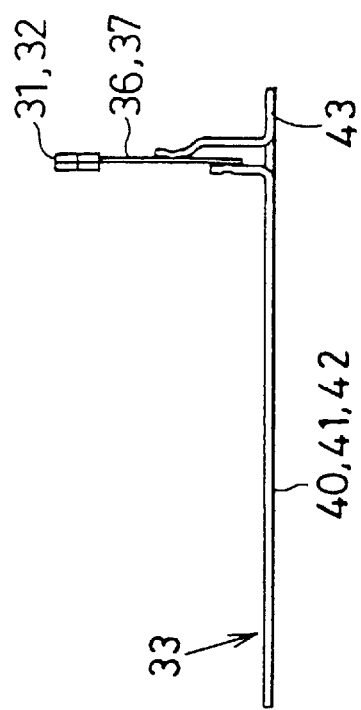
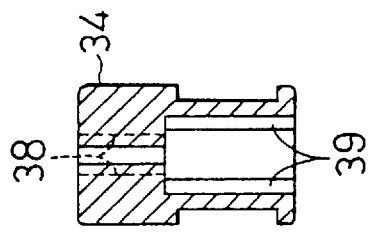
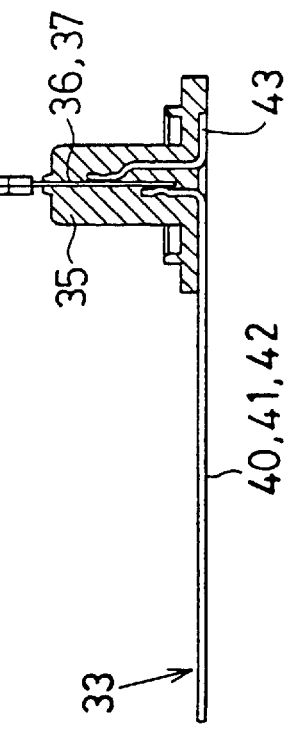

ROTATION ANGLE DETECTOR HAVING FIRST MOLDED MEMBER INTEGRATING MAGNETIC SENSING ELEMENT AND OUTPUT TERMINAL AND SECOND MOLDED MEMBER INTEGRATING STATOR CORE AND FIRST MOLDED MEMBER

CROSS REFERENCE TO RELATED APPLICATION

This application is based on and incorporates herein by reference Japanese Patent Application Nos. Hei. 11-311126 filed on Nov. 1, 1999, 2000-22529 filed on Jan. 31, 2000, and 2000-147238 filed on May 19, 2000.

BACKGROUND OF THE INVENTION

1. Field of the Invention

The present invention relates to a rotation angle detector suitable for use in a throttle position sensor of a vehicle.

2. Description of Related Art

JP-A-62-182449 discloses a throttle position sensor in which an insulating plate having a variable resister is fixed to the end of a throttle valve shaft. The insulating plate rotates with the throttle valve shaft. A throttle position signal is output from a terminal fixed at a sensor cover side of the throttle position sensor.

However, in JP-A-62-182449, since the terminal is mechanically fixed to the throttle position sensor, the terminal is not appropriately positioned with respect to the insulating plate, thereby reducing a detecting accuracy of the throttle valve opening degree.

JP-A-2-130403 discloses a throttle position sensor in which a permanent magnet and a yoke are fixed to a throttle valve shaft. The permanent magnet and the yoke rotate with the throttle valve shaft. A Hall element detecting a rotation angle of the throttle valve and a signal calculate circuit are disposed on a board, and are connected to a connector through a lead frame. A throttle position signal is output through the connector.

However, in JP-A-2-130403, the board, the lead frame, and the connector are integrated by resin, and this integrated member is mechanically screwed to a throttle body, so that the throttle valve shaft may slide in the axial direction thereof.

SUMMARY OF THE INVENTION

A first object of the present invention is to accurately position a magnetic sensing element with respect to a magnet for improving an accuracy of detecting a rotation angle. A second object of the present invention is to easily connect the magnetic sensing element and an outside connection terminal.

According to a first aspect of the present invention, a resin molded member integrates and supports a non-contact type magnetic sensing element and an output terminal by resin molding. Thus, the magnetic sensing element and the output terminal are accurately positioned. As a result, when a resin molded member supporting a sensor unit including the magnetic sensing element is attached to a rotary member, a gap between the magnetic sensing element and a magnet disposed in the rotary member is accurately attained, thereby improving an accuracy of detecting a rotation angle of the rotary member.

According to a second aspect of the present invention, a first resin molded member integrating and supporting a non-contact type magnetic sensing element and an output terminal by resin molding and a stator core strengthening a magnetic force around the non-contact type magnetic sensing element are integrated and supported by resin molding. Thus, the magnetic sensing element and the output terminal are accurately positioned, thereby improving an accuracy of detecting a rotation angle of a rotary member.

According to a third aspect of the present invention, a condenser is disposed between an outside connection terminal and a ground terminal and connected thereto. Thus, a stable output signal is effectively attained from an electric device, and a stable input signal is effectively supplied into the electric device. Further, since the condenser is supported by a resin molded member of which forming pressure is lower than a general injection pressure, the condenser is not highly pressed, thereby preventing the condenser from separating from the outside connection terminal and the ground terminal.

According to a fourth aspect of the present invention, a stator core includes a first stator core portion made by stacking a plurality of magnetic plates in a thickness direction thereof, a second stator core portion made by stacking a plurality of magnetic plates in a thickness direction thereof, and a non-magnetic plate connecting an end surface of the first stator core portion to an end surface of the second stator core portion. Thus, the width of a magnetic sensing gap formed between the first and second stator core portions are accurately kept without a resin spacer, thereby improving en efficiency of a magnetic circuit. Therefore, the stator core is made by one component combining the magnetic plate and non-magnetic plate, thereby reducing the number of parts and production cost.

BRIEF DESCRIPTION OF THE DRAWINGS

Additional objects and advantages of the present invention will be more readily apparent from the following detailed description of preferred embodiments thereof when taken together with the accompanying drawings in which:

FIG. 7A is a side view showing the Hall ICs and the lead frame (first embodiment);

FIG. 7B is a cross-sectional view showing a connect holder covering the lead frame (first embodiment);

FIG. 7C is a cross-sectional view showing a stator core (first embodiment);

DETAILED DESCRIPTION OF PREFERRED EMBODIMENTS

First Embodiment

Figure 1:
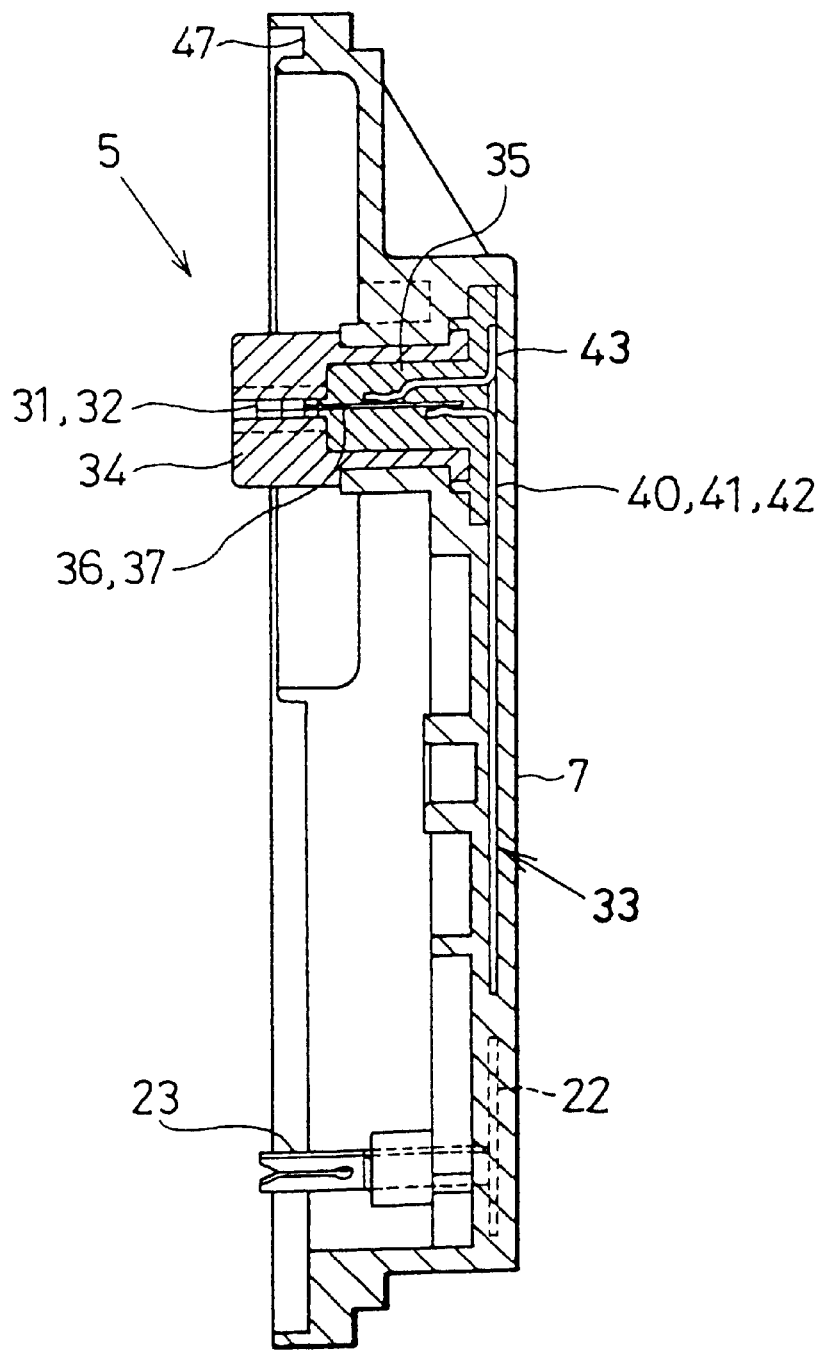
FIG. 1 is a cross-sectional view showing a principal portion of a throttle position sensor (first embodiment)
Figure 2:
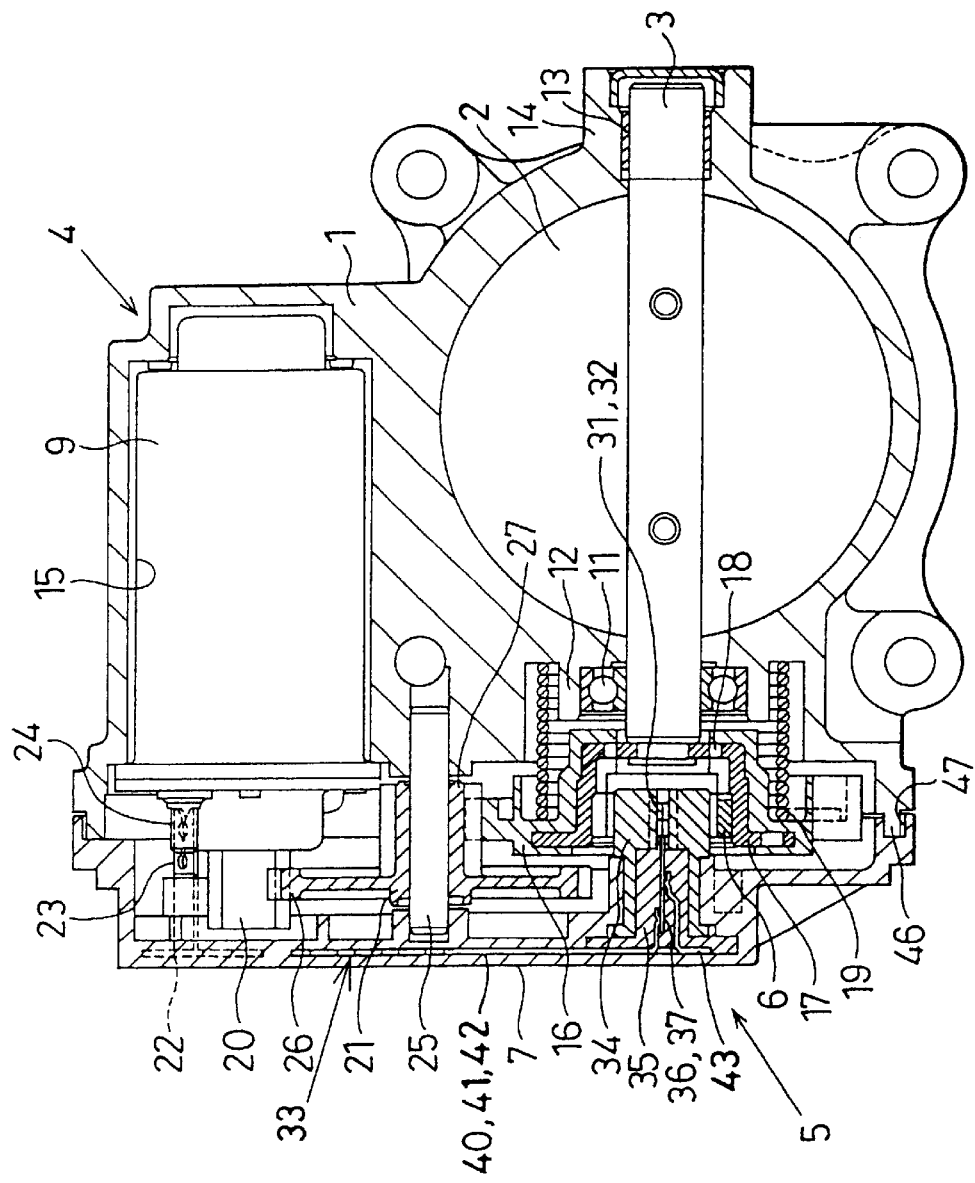
FIG. 2 is a cross-sectional view showing an intake air controller for an internal combustion engine (first embodiment)
Figure 3:
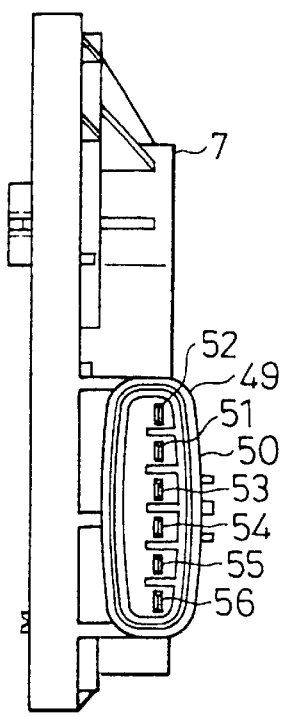
FIG. 3 is a front view showing a sensor cover (first embodiment)
Figure 4:
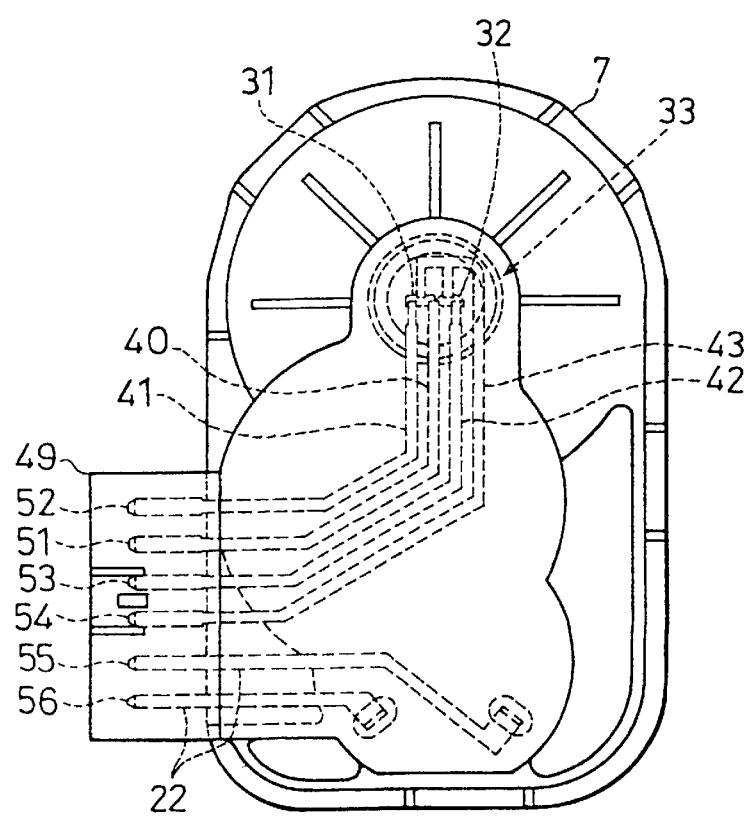
FIG. 4 is a plan view showing the sensor cover (first embodiment)

The first embodiment will be described with reference to FIGS. 1–7. FIG. 1 shows primary elements of a throttle position sensor 5 corresponding to a rotation angle detector of the present invention, FIG. 2 shows an intake air controller for internal combustion engine, and FIGS. 3 and 4 show a sensor cover 7.

The intake air controller includes a throttle body 1, a throttle valve 2, a valve shaft 3 for the throttle valve 2, an actuator 4, and an ECU (Engine Controlling Unit). The throttle body 1 forms an intake air passage leading air to the engine. The throttle valve 2 is rotatably supported by the throttle body 1. The actuator 4 rotates the valve shaft 3, and the ECU electrically controls the actuator 4.

The intake air controller controls the amount of the intake air flowing into the engine in accordance with an accelerator pedal stroke, thereby controlling the rotation speed of the engine. An accelerator opening degree sensor is connected to the ECU to convert the accelerator pedal stroke into electrical signal, and to input the electrical signal into the ECU. Further, the throttle position sensor 5 is connected to the ECU to convert the opening amount of the throttle valve 2 into electrical signal, and input the electrical signal into the ECU.

The throttle body 1 is made of aluminum die-cast, and is a main housing containing and supporting the throttle valve 2. The throttle body 1 is fixed to an intake manifold of the engine by a bolt. The throttle body 1 includes bearing holders 12, 14 and a motor chamber 15 containing a motor 9. The bearing holder 12 rotatably supports the front end of the shaft 3 through a ball bearing 11, and the bearing holder 14 rotatably supports the rear end of the shaft 3 through a thrust bearing 13.

The throttle valve 2, which corresponds to a rotary member of the present invention, is a butterfly type rotary valve controlling the intake air-flow amount. In the present embodiment, the throttle valve 2 is screwed to the outer peripheral surface of the shaft 3 and substantially formed in a disc shape.

A rotor core 17 into which a resin gear 16 is insert-formed is mechanically fixed to the front end of the shaft 3. A coil shaped return spring 19 is provided outside the rotor core 17. When the engine idles, the return spring 19 resets the throttle valve 2 and the shaft 3 to their original position.

The actuator 4 rotates the throttle valve 2 and the shaft 3. The actuator 4 includes the motor 9, a pinion gear 20, an intermediate speed reduction gear 21, and the resin gear 16. The motor 9 is electrically controlled by the ECU. The pinion gear 20 is fixed to the output shaft of the motor 9. The resin gear 16 engages with the intermediate speed reduction gear 21 to rotate with together.

An electric current is supplied with the motor 9 through an electric terminal 22, a connection terminal 23, and an electric supply terminal 24 to operate the motor 9. The electric terminal 22 is built and positioned in a sensor cover 7. The connection terminal 23 is integrally connected with the electric terminal 22 and protrudes from the sensor cover 7 to the motor 9. The electric supply terminal 24 is detachably connected with the connection terminal 23. The pinion gear 20 is made of resin and formed in a cylindrical worm, and is detachably fixed to the motor shaft to rotate therewith.

The intermediate speed reduction gear 21 is made of resin, and rotatably supported by a fixed axis 25 being the rotation center thereof. The intermediate speed reduction gear 21 includes a large gear 26 at the front end thereof and a small gear 27 at the rear end thereof. The large gear 26 is formed in a cylindrical worm wheel.

The throttle position sensor 5 includes a permanent magnet 6, a first Hall IC 31, a second Hall IC 32, a lead frame (a plurality of terminals) 33, and a two-piece stator core 34. The permanent magnet 6 is cylindrically formed and generates a magnetic field. The first Hall IC 31 and the second Hall IC 32 are disposed in the sensor cover 7. The lead frame 33 is formed by a metal thin plate and electrically connects the Hall ICs 31, 32 to the ECU. The two-piece stator core 34 is made of iron series metal and strengthen the magnetic field around the Hall ICs 31, 32.

The permanent magnet 6 is fixed to the inner peripheral surface of the metal rotor core 17 by adhesive or resin mold. The rotor core 17 rotates with the throttle valve 2 and the shaft 3. The permanent magnet 6 supplies a magnetic flux to a magnetic circuit of the throttle position sensor 5. The permanent magnet 6 includes a first half arc portion in which North Pole is located radially inside and South Pole is located radially outside, and a second half arc portion in which South Pole is located radially inside and North Pole is located radially outside. The rotor core 17 includes a positioning hole 18 for attaching the rotor core 17 at its idling position with respect to the shaft 3.

Figure 5:
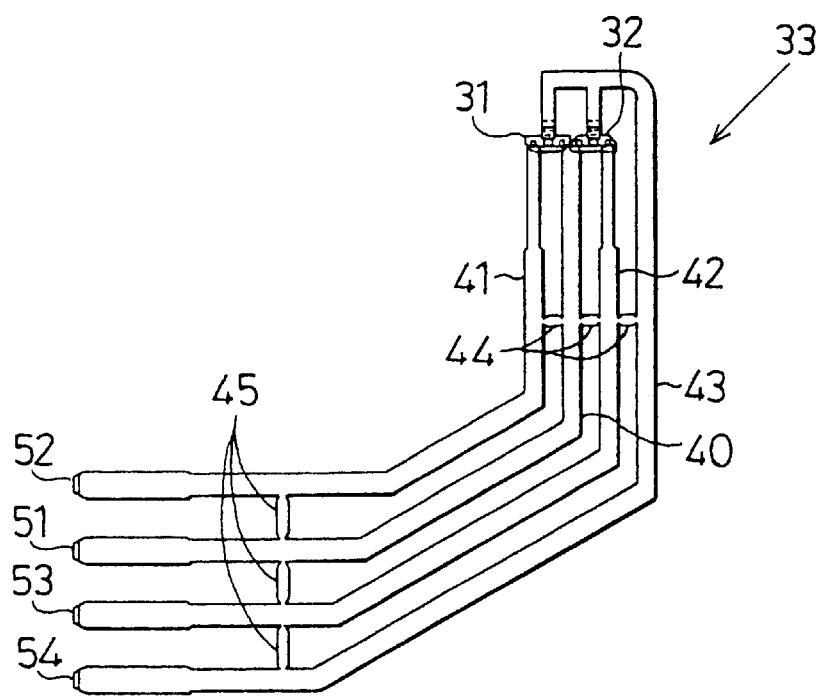
FIG. 5 is a plan view showing Hall ICs and a lead frame a rotation transmitter (first embodiment)
Figure 6:
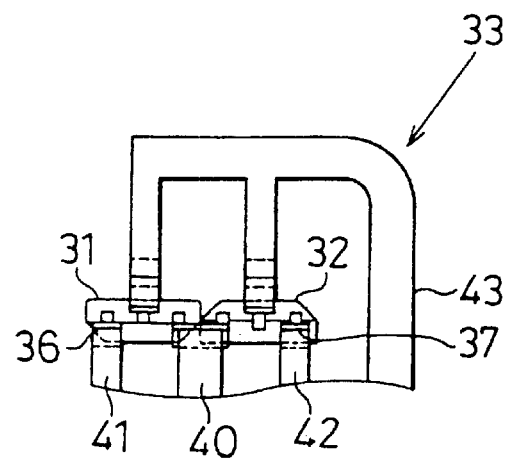
FIG. 6 is an enlarged view showing a connection portion between the Hall IC and the lead frame (first embodiment)

The first and second Hall ICs 31, 32, which correspond to a non-contact magnetic sensing element of the present invention, is disposed radially inside the permanent magnet 6 to face each other. When a magnetic field of North Pole or South Pole is generated on the sensing surface of the Hall ICs 31, 32, they generate electric voltages in accordance with the magnetic field. For example, the Hall ICs 31, 32 generate a positive electric potential when the North Pole magnetic field is generated, and the Hall ICs 31, 32 generate a negative electric potential when the South Pole magnetic field is generated. In the present embodiments, as shown in FIGS. 5 and 6, the Hall ICs 31, 32 are disposed in parallel at 180 degrees interval.

The lead frame 33 is, as shown in FIG. 1, built in a connect holder 35 and the sensor cover 7 to be positioned and supported. The lead frame 33 is made of electric conductive metal such as copper sheet, and includes an input terminal 40, first and second output terminals 41, 42 and a ground terminal 43. The input terminal 40 is made of electric conductive plate and impresses a battery voltage (for example, 5.0 V) into the Hall ICs 31, 32.

The output terminals 41, 42, which correspond to an outside connection terminal of the present invention, are made of electric conductive plate, and receive an opening degree signal of the throttle valve 2 from the Hall ICs 31, 32. The lead frame 33 includes connection pieces 44, 45 to keep intervals between the input terminal 40, the output terminals 41, 42 and the ground terminal 43. The connection pieces 44, 45 are finally removed. A connection holder 35 is made of thermoplastic resin such as PBT, and covers connection portions between the lead frame 33 and lead wires 36, 37 of the Hall ICs 31, 32 (see FIG. 7B).

The two-piece stator core 34 includes a magnetic sensing gap at the center thereof having a predetermined width, for providing a parallel magnetic field. The connection holder 35 holds the width of the magnetic sensing gap, and the Hall ICs 31, 32 are disposed in the magnetic sensing gap.

The two-piece stator core 34 is, as shown in FIGS. 7B and 7C, fit and fixed to the connection holder 35. The stator core 34 includes a groove 38 to attain a clearance (for example 0.2 mm) with the Hall ICs 31, 32, and a fit portion 39 to be engaged outside the connect holder 35.

As shown in FIG. 2, the sensor cover 7 covers the front end of the throttle body 1. The sensor cover 7 is made of thermoplastic resin such as PBT, and electrically insulates between each terminal of the throttle position sensor 5. The sensor cover 7 includes a concave portion 47 fitting to the projection 46 of the throttle body 1, and is attached to the throttle body 1 by a clip.

Since the sensor cover 7 is attached to the throttle body 1 in such a manner that the projection 46 engages with the concave portion 47, the Hall ICs 31, 32 built in the sensor cover 7 are positioned with respect to the permanent magnet 6 with high accuracy.

As shown in FIG. 3, a connector 49 is integrally provided on the side surface of the sensor cover 7. The connector 49 includes a connector shell 50, connector pins 51–54 of the terminals 40–43, and connector pins 55, 56 of the motor electric terminal 22.

An assembly procedure of the throttle position sensor 5 of the present embodiments will be explained with reference to FIGS. 1–7.

The lead frame 33 is made by press-forming an electric conductive metal sheet. As shown in FIGS. 5 and 7A, the lead wires 36, 37 of the Hall ICs 31, 32 are electrically connected to the input terminal 40, the output terminal 41, and the ground terminal 43 in the lead frame 33.

As shown in FIG. 7B, the connection portions of the lead wires 36, 37, and the terminals 41, 42, 43 are covered and integrated by PBT resin. Here, the Hall ICs 31, 32 are supported in such a manner that the sensing surfaces thereof are exposed from the connect holder 35. In this way, the Hall ICs 31, 32 and the lead frame 33 are integrated within the connect holder 35.

Next, as shown in FIG. 7C, the two-piece stator core 34 is fit to the connector holder 35. Here, the two-piece stator core 34 surrounds and covers the Hall ICs 31, 32. In this way, the stator core 34 is fixed to the connector holder 35, thereby attaining the 0.2 mm clearance between the Hall ICs 31, 32 and the stator core 34.

Finally, as shown in FIG. 1, the lead wires 36, 37, the terminals 41, 42, 43, the stator core 34, and the motor electric terminal 22 are integrated by PBT resin within the sensor cover 7.

An operation of the intake air controller for internal combustion engine of the present embodiment will be explained with reference to FIGS. 1 and 2.

An accelerator opening degree signal is input into the ECU through the accelerator opening degree sensor. The ECU supplies an electric current to the motor 9, so that the output shaft of the motor 9 rotates. The pinion gear 20 rotates in accordance with the rotation of the output shaft of the motor 9, and a torque is transmitted to the large gear 26 of the intermediate speed reduction gear 21.

The small gear 27 rotates in accordance with the rotation of the large gear 26, so that the resin gear 16 engaging with the small gear 27 rotates. The rotor core 17 rotates with the resin gear 16, and the shaft 3 rotates by a desired rotation degree. In this way, the throttle valve 2 is controlled to get and keep a desired opening degree in the intake air passage.

The throttle position sensor 5 detects the position of the permanent magnet 6 through the Hall ICs 31, 32, and outputs a throttle opening degree signal into the ECU through the output terminals 41, 42. The ECU calculates and determines a fuel injection amount based on the throttle opening degree signal.

As described above, according to the throttle position sensor 5 directly attached to the throttle valve 2 in the present embodiment, the Hall ICs 31, 32 are assembled into the sensor cover 7 without being influenced by heat and force during the assembly procedure, so that the Hall ICs 31, 32 are highly accurately positioned with respect the permanent magnet 6. Thus, the accuracy of detecting the opening degree of the throttle valve 2 is improved.

As shown in FIGS. 5 and 6, since the Hall ICs 31, 32 are disposed in parallel at 180 degree interval, the Hall ICs 31, 32 and the lead frame 33 are easily assembled.

Here, the output signal of the second Hall IC 32 against the first Hall IC 31 decreases from the engine idling position to the full opening direction of the throttle valve 2. However, the output signal is trimmed in the ECU or trimmed by writing a data into the Hall IC itself, so that the output signal from two magnetic sensing elements increases from the engine idling position to the full opening direction of the throttle valve 2.

In the present embodiment, two Hall ICs 31, 32 are used. Thus, when one Hall IC does not work, the other Hall IC detects the throttle opening degree and an error of the non-working Hall IC.

Second Embodiment

Figure 8:
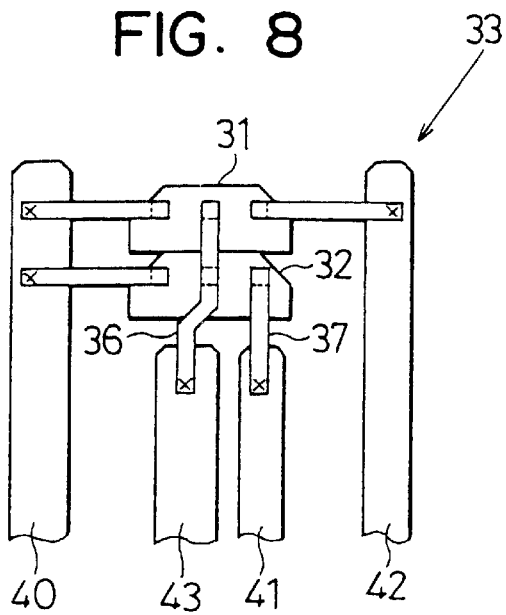
FIG. 8 is an enlarged view showing a connection portion between a Hall IC and a lead frame (second embodiment)

In the second embodiment, as shown in FIG. 8, the Hall ICs 31, 32 are disposed in series in the same direction. Thus, the Hall ICs 31, 32 and the lead frame 33 are easily assembled.

Third Embodiment

The third embodiment will be explained with reference to FIGS. 9–12.

As in the first embodiment, the intake air controller includes a throttle body 1, a throttle valve 2, a valve shaft 3 for the throttle valve 2, an actuator 4, and an ECU (Engine Control Unit). The throttle body 1 forms an intake air passage to the engine. The throttle valve 2 is rotatably supported by the throttle body 1. The actuator 4 rotates the valve shaft 3, and the ECU electrically controls the actuator 4.

The throttle position sensor 5 includes a permanent magnet 6, a first Hall IC 61, a second Hall IC 62, a lead frame (a plurality of terminals) 63, and a two-piece stator core 64. The permanent magnet 6 is cylindrically formed and generates a magnetic field. The first Hall IC 61 and the second Hall IC 62 are disposed in the sensor cover 7. The lead frame 63 is formed by a metal thin plate and electrically connects the Hall ICs 61, 62 to the ECU. The two-piece stator core 64 is made of iron series metal and strengthens the magnetic field around the Hall ICs 61, 62.

Figure 11:
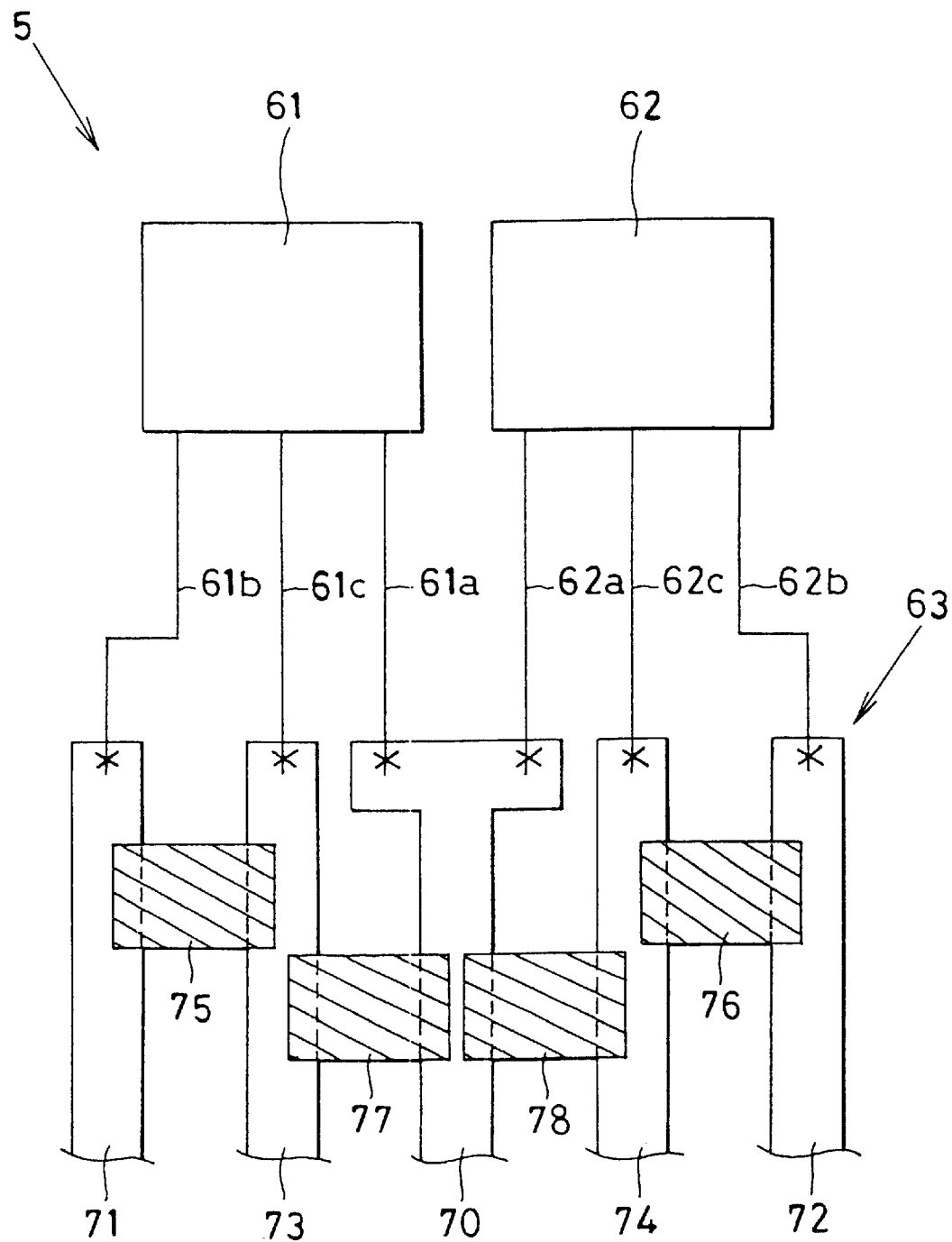
FIG. 11 is an enlarged view showing connection portions of the Hall IC, chip condensers, and the lead (third embodiment)

As shown in FIG. 11, the first and second Hall ICs 61, 62, which correspond to a non-contact magnetic sensing element of the present invention, are disposed radially inside the permanent magnet 6 to face each other. The Hall ICs 61, 62 operate like the Hall ICs 31, 32 in the first embodiments, and include lead wires 61a–61c and 62a–62c respectively. The lead wires 61a, 62a are output terminals of the Hall ICs 61, 62. The lead wires 61b, 62b are input terminals of the Hall ICs 61, 62. The lead wires 61c, 62c are ground terminals of the Hall ICs 61, 62.

Figure 9:
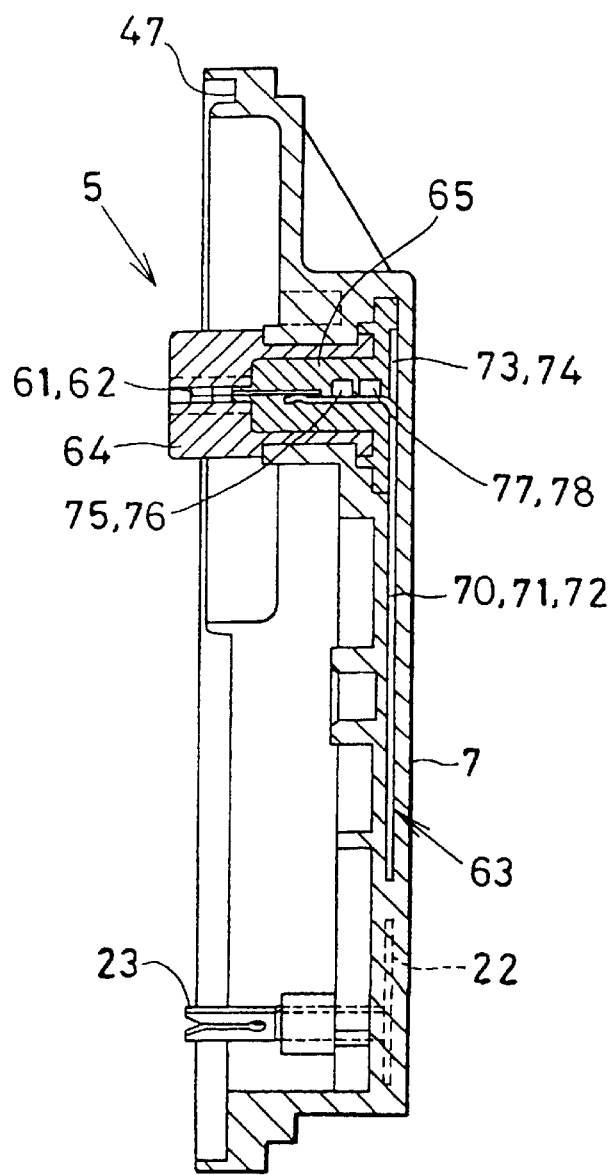
FIG. 9 is a cross-sectional view showing a principal portion of a throttle position sensor (third embodiment)
Figure 10:
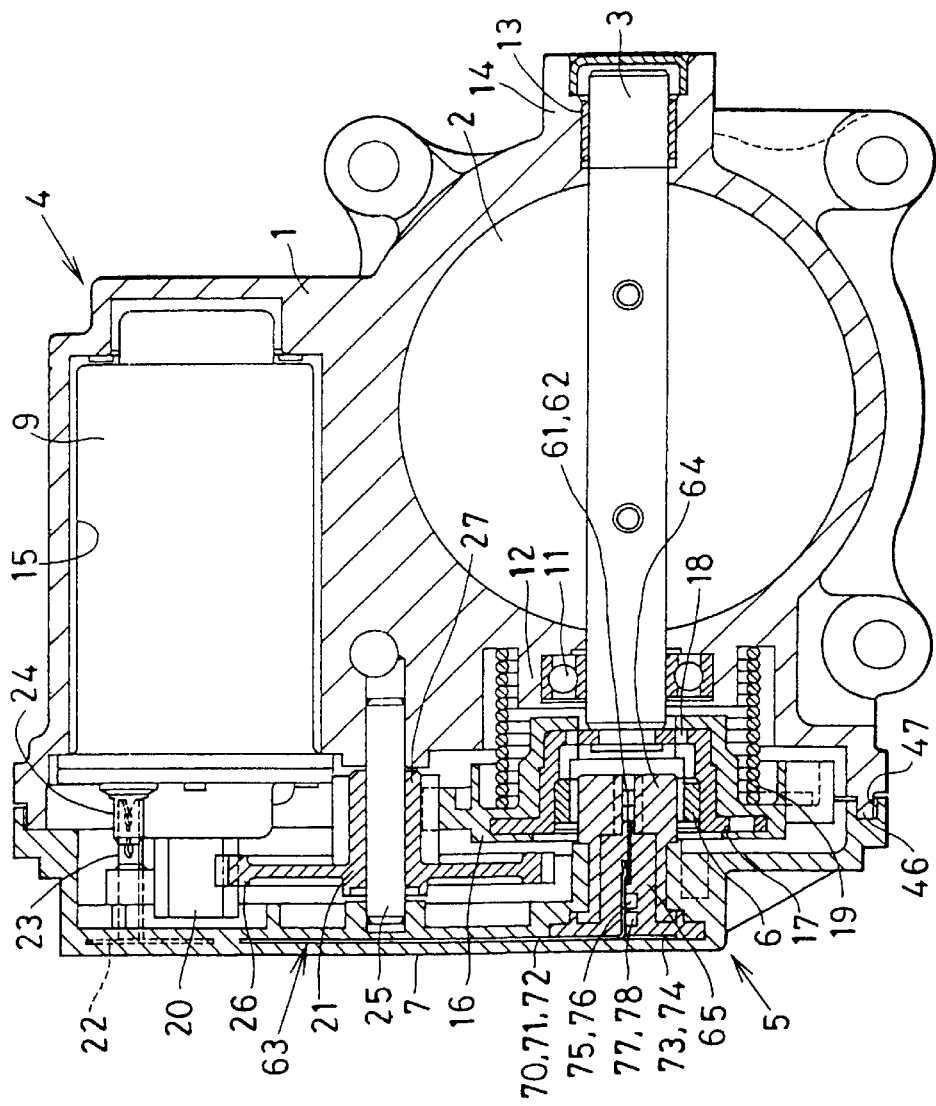
FIG. 10 is a cross-sectional view showing an intake air controller for an internal combustion engine (third embodiment)

The lead frame 63 is, as shown in FIG. 9, built in a connect holder 65 and the sensor cover 7 to be positioned and supported. The lead frame 63 includes an input terminal 70, first and second output terminals 71, 72, ground terminals 73, 74, and chip condensers 75–78.

Tip ends of the lead wires 61a–61c and 62a–62c are spot welded and electrically connected to the lead frame 63. Silver plates are coated on both end surfaces of the lead frame 63 where the chip condensers 75–78 are connected.

The input terminal 70 is made of electric conductive plate such as copper plate and impresses a battery voltage (for example, 5.0 V) into the Hall ICs 61, 62. The output terminals 71, 72, which correspond to an outside connection terminal of the present invention, are made of electric conductive plate, and send an opening degree signals of the throttle valve 2 from the Hall ICs 61, 62 to the ECU. The ground terminals 73, 74 made of electric conductive metal ground the lead wires 61c, 62c of the Hall ICs 61, 62 to a vehicle body.

The chip condensers 75–78 are exposed and electrically connected to the one side surface of the lead frame 63 by adhesive. The chip condensers 75–78 prevent the lead frame 63 from arising radio wave noise influencing a AM/FM radio, a transceiver, a personal wireless equipment, and TV. The chip condensers 75–78 are EMC (Electro Magnetic Compatibility) condensers for attaining output stability, and prepare against an EMI (Electric Magnetic Interference).

As shown in FIG. 11, the chip condensers 75, 76 are connected between the output terminals 71, 72 and the ground terminals 73, 74 respectively. Similarly, the chip condensers 77, 78 are connected between the input terminal 70 and the ground terminals 73, 74 respectively.

Both terminal surfaces of the chip condensers 75–78 are coated by silver-lead metal alloy. Both terminals of the chip condensers 75–78 are respectively and electrically connected to the input terminal 70, the output terminals 71, 72 and the ground terminals 73, 74 by adhesive made of silver paste.

Figure 12A:
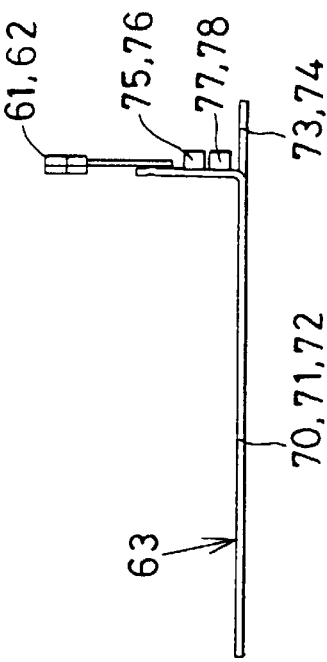
FIG. 12A is a side view showing the Hall ICs and the lead frame (third embodiment)
Figure 12C:
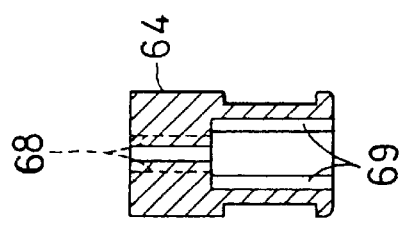
FIG. 12C is a cross-sectional view showing a stator core (third embodiment)
Figure 12B:
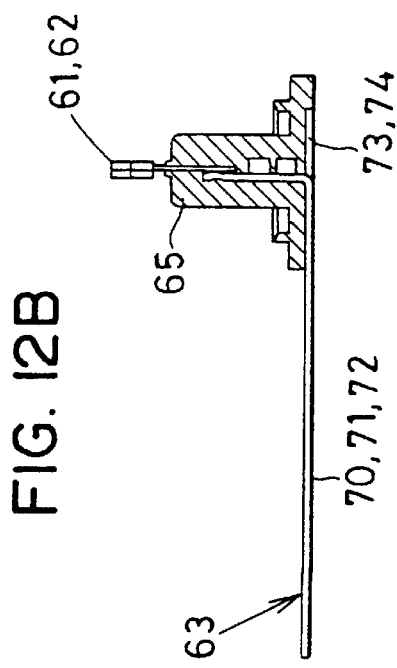
FIG. 12B is a cross-sectional view showing a connect holder covering the lead frame (third embodiment)
Figure 13:
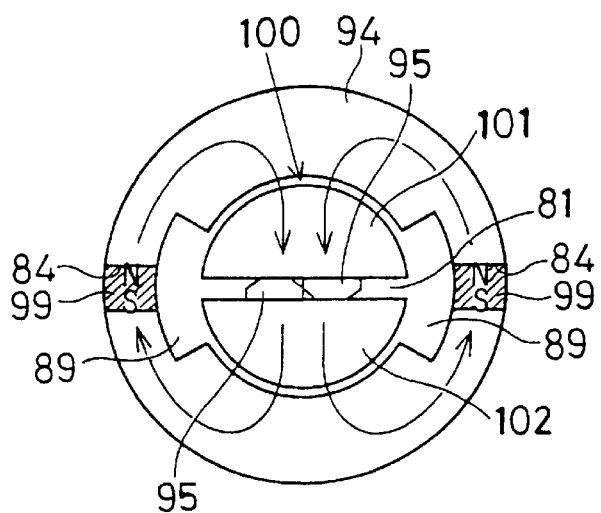
FIG. 13 is a top view showing a rotor core, a permanent magnet and a two-piece stator core (fourth embodiment)
Figure 14:
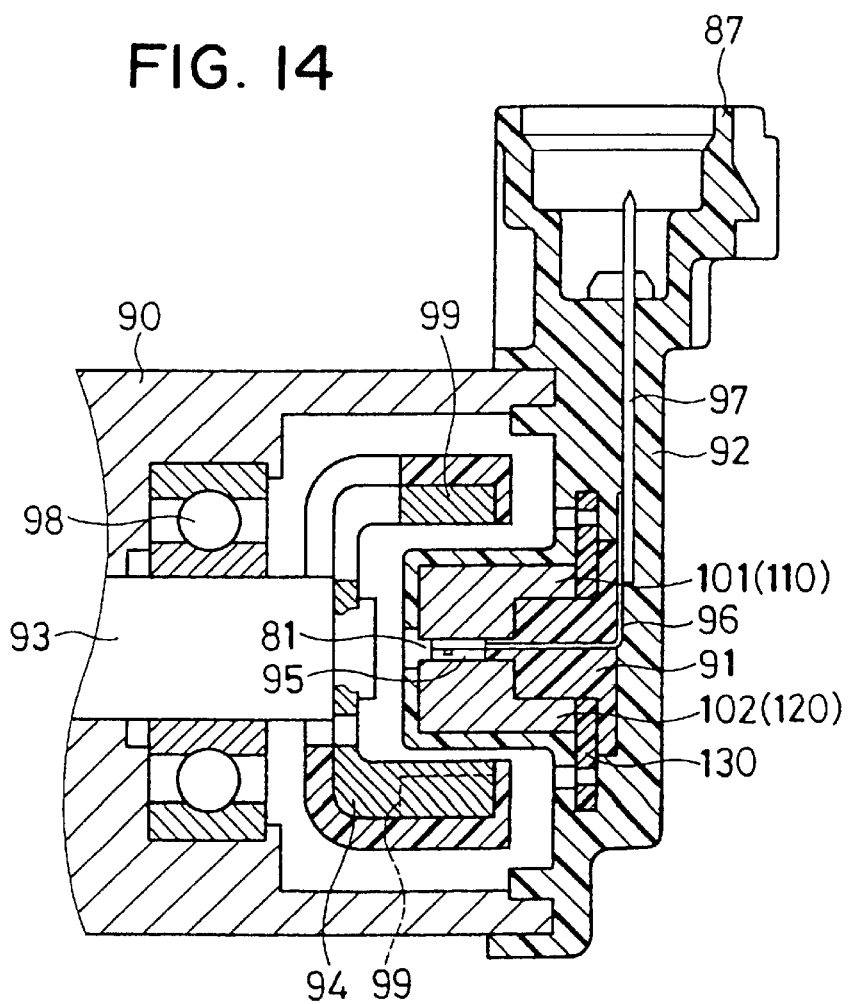
FIG. 14 is a cross-sectional view showing a principal portion of a throttle position sensor (fourth embodiment)

A connect holder 65 is made of ultraviolet plastic resin such as epoxy resin, and covers connection portions between the lead wires 61a–61c, 62a–62c and the terminals 70–74, and connection portions between terminals of the chip condensers 75–78 and the terminals 70–74 (see FIG. 12B).

The two-piece stator core 64 is, as shown in FIGS. 12B and 12C, fit and fixed to the connect holder 65. The stator core 64 includes a groove 68 to attain clearances with the Hall ICs 61, 62, and a fit portion 69 to be engaged outside the connect holder 65.

An assembly procedure of the throttle position sensor 5 of the present embodiments will be explained with reference to FIGS. 9–12.

The lead frame 63 is made by press-forming an electric conductive metal sheet. Silver plate is coated on both sides or one side of the lead frame 63. As shown in FIGS. 11 and 12A, the lead wires 61a–61c, 62a–62c of the Hall ICs 61, 62 are spot-welded to be electrically connected to the tip ends (top ends in FIG. 11) of the input terminal 70, the output terminals 71, 72 and the ground terminals 73, 74 in the lead frame 63.

Silver-lead alloy is coated on both terminals of each chip condenser 75–78. The chip condenser 75 is electrically connected to the output terminal 71 and the ground terminal 73 by adhesive made of silver paste. Similarly, the chip condenser 76 is electrically connected to the output terminal 72 and the ground terminal 74, the chip condenser 77 is connected to the input terminal 70 and the ground terminal 73, and the chip condenser 78 is connected to the input terminal 70 and the ground terminal 74. In this way, each chip condenser 75–78 is connected to the lead frame 63 while being exposed.

As shown in FIG. 12B, the connection portions of the lead wires 61a–61c, 62a–62c, and the terminals 70–74, and the chip condensers 75–78 are covered and integrated by epoxy resin. Here, a forming pressure is lower than a general injection pressure. The Hall ICs 61, 62 are supported in such a manner that the sensing surfaces thereof are exposed from the connect holder 65. In this way, the Hall ICs 61, 62 and the lead frame 63 are integrated within the connect holder 65.

Next, as shown in FIG. 12C, the two-piece stator core 64 is fit to the connector holder 65. Here, the two-piece stator core 64 surrounds and covers the Hall ICs 61, 62. In this way, the stator core 64 is fixed to the connect holder 65, thereby attaining the clearance between the Hall ICs 61, 62 and the stator core 64.

Finally, as shown in FIG. 9, the lead wires 61a–61c, 62a–62c, the terminals 70–74, the chip condensers 75–78, the stator core 64, and the motor electric terminal 22 are integrated by PBT resin within the sensor cover 7.

As described above, according to the throttle position sensor 5 directly attached to the throttle valve 2 in the present third embodiment, the Hall ICs 61, 62 are assembled into the sensor cover 7 without being influenced by heat and force during the assembly procedure, so that the Hall ICs 61, 62 are highly accurately positioned with respect the permanent magnet 6. Thus, the accuracy of detecting the opening position of the throttle valve 2 is improved.

In the present embodiment, the forming pressure of first step to integrate the connection portions of the lead wires 61a–61c, 62a–62c, and the terminals 70–74, and the chip condensers 75–78 is lower than the general injection pressure. Thus, the chip condensers 75–78 are not highly pressed, thereby preventing the chip condensers 75–78 from separating from the lead frame 63. Since the forming pressure of the first step is lower than the general injection pressure, a first step product can endure against a final injection-forming step, and the connect holder 65 can cover the roots of the lead wires 61a–61c, 62a–62c, thereby improving a waterproof performance.

In general, the chip condensers 75–78 should not be transformed under the resin forming. For example, it is desired to resin-form the chip condensers 75–78 while protecting around the chip condensers 75–78.

Thus, the battery voltage is effectively supplied to the Hall ICs 61, 62, and the output signal is effectively attained from the Hall ICs 61, 62.

Fourth Embodiment

The fourth embodiment will be explained with reference to FIGS. 13–17.

In the fourth embodiment, the intake air controller includes a housing 90, a sensor cover 92, a rotor core 94, two Hall ICs 95, two-piece stator core 100, a lead frame 97. The housing 90 is integrated with a throttle body. The sensor cover 92 covers the opening (right end in FIG. 14) of the housing 90. The rotor core 94 is formed in a cylindrical cup and rotates with a throttle shaft 93. The Hall IC 95 is a magnetic sensing element disposed in the stator core 100. The two-piece stator core 100 is cylindrically formed and makes a magnetic circuit with the rotor core 94. The lead frame 97 is made of electric conductive metal thin plate and electrically connects lead wires 96 of the Hall ICs 95 to an outside ECU.

The housing 90 rotatably supports the throttle shaft 93 through a ball bearing 98. The rotor core 94 is made of magnetic resin such as iron, and is mechanically fixed to the rear end of the throttle shaft 93. The stator core 100 is disposed radially inside the rotor core 94 concentrically with the rotor core 94.

The rotor core 94 includes two slits 84 at circumferentially 180 degrees interval, and a permanent magnet 99 is installed and fixed by adhesive in each slit 84. The permanent magnets 99 are arranged in such a manner that the same polarity magnetic poles thereof magnetically face to each other through half arc portions of the rotor core 94, so that the magnetic field of the two permanent magnets 99 repel to each other inside the rotor core 94.

The inner surface of the rotor core 94, except areas abutting on the permanent magnets 99, faces the outer surface of the stator core 100 with a small air gap. Therefore, as denoted by arrows in FIG. 13, a magnetic flux starts from the N-pole of the permanent magnet 99, and passes through the rotor core 94, the stator core 100 and the rotor 94 again, and reaches the S-pole of the permanent magnet 99. A small air space 89 is formed at the inner surface of the rotor core 94 abutting on the permanent magnet 99, for preventing a short circuit of the magnetic flux between the stator core 100 and the magnetic poles of the permanent magnet 99.

The sensor cover 92 is made of thermoplastic resin such as PBT, and a spacer 91 is also made of thermoplastic resin such as PBT. The sensor cover 92 and the spacer 91 support the lead wires 96 and the lead frames 97. The sensor cover 92 integrally includes a connector 87 at the upper end thereof, to which a connector of a wire harness is connected. The wire harness connects a tip end of the lead frame 97 to the outside ECU.

A structure of the two-piece stator core 100 will be explained with reference to FIGS. 13–17.

The two-piece stator core 100 includes a magnetic sensing gap 81 at the center thereof having a predetermined width, for providing a parallel magnetic field. The magnetic sensing gap 81 is formed to penetrate through the stator core 100 in the radial direction.

Figure 15:
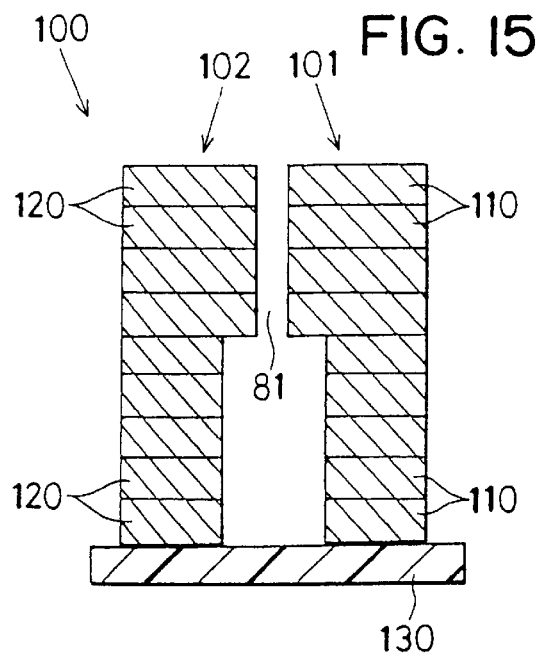
FIG. 15 is a cross-sectional view showing the two-piece stator core (fourth embodiment)

As shown in FIG. 15, the two-piece stator core 100 includes a first stator core 101, a second stator core 102, and a non-magnetic disc plate 130. The first stator core 101 is semi-cylindrically formed, and is made by stacking a plurality of semi-disc magnetic plates 110 in the thickness direction thereof, and integrating them by press-insertion or adhesive. The second stator core 102 is also semi-cylindrically formed, and is made by stacking a plurality of semi-disc magnetic plates 120 in the thickness direction thereof, and integrating them by press-insertion or adhesive. The non-magnetic disc plate 130 connects to one ends of the first and second stator cores 101, 102 by press insertion or adhesive. Here, the first and second stator cores 101, 102 may be a single parts made by casting iron material alternatively.

Figure 16:
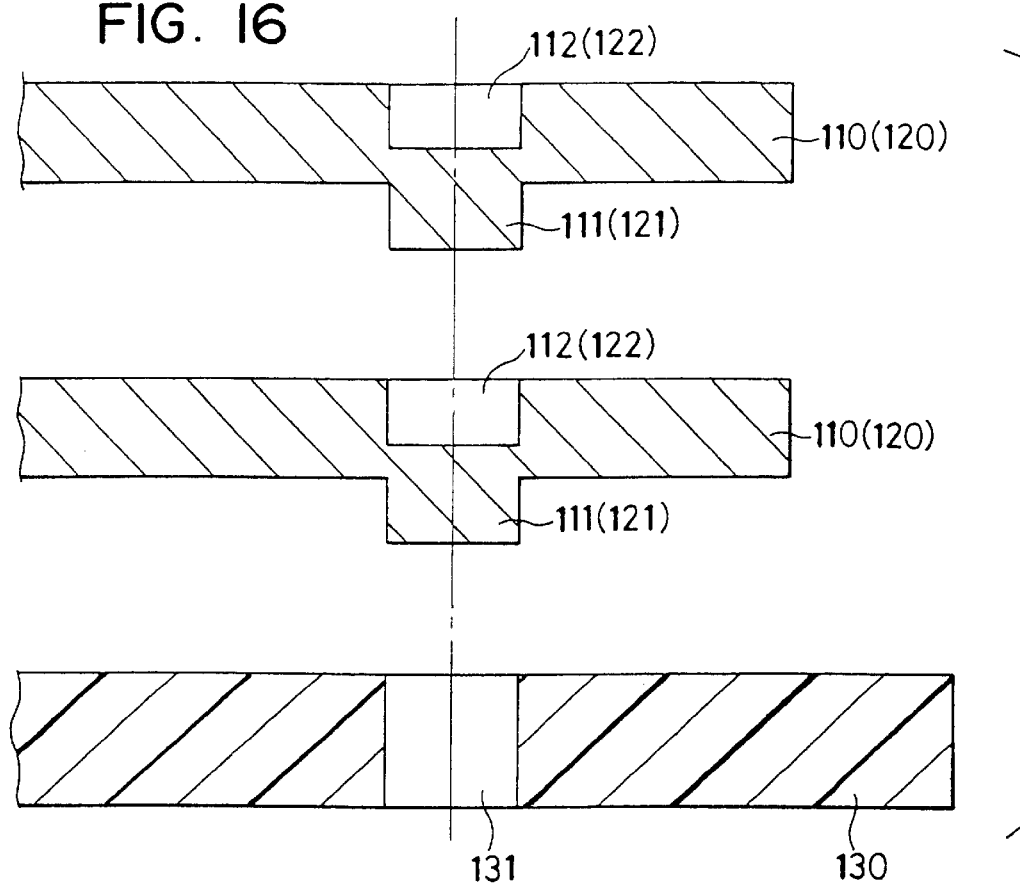
FIG. 16 is a cross-sectional view showing a connection structure of the two-piece stator core (fourth embodiment)

Each magnetic plate 110, 120 is made of iron metal plate or silicon steel plate. The non-magnetic plate 130 is made of non-magnetic resin such as PBT, PPS, nylon, epoxy resin, or the like, or made of non-magnetic metal plate such as stainless steel, brass, aluminum, or the like. Further, as shown in FIG. 16, the magnetic plate 110, 120 include a plurality of projections 111, 121 at the bottom surfaces thereof, and a plurality of concave portions 112, 122 at the top surfaces thereof for positioning, respectively. The non-magnetic plate 130 includes a plurality of perforations 131 for positioning.

First magnetic plates 110, 120 are put on the top surface of the non-magnetic plate 130 while fitting the projections 111, 121 into the perforations 131. Next, second magnetic plates 110, 120 are put on the top surface of the first magnetic plates 110, 120 while fitting the projections 111, 121 into the concave portions 112, 122 of the first magnetic plates 110, 120.

After the last magnetic plates 110, 120 are put on the second last magnetic plates 110, 120, punches are press-inserted into the concave portions 112, 122 of the last magnetic plates 110, 120, so that the plurality of magnetic plates 110, 120 are stacked and the non-magnetic plate 130 is connected to the one ends of the first magnetic plates 110, 120. In this way, since centering of the magnetic plates 110, 120 are attained, the magnetic plates 110, 120 are easily stacked on the non-magnetic plate 130 while providing the predetermined width magnetic sensing gap 81.

Figure 17:
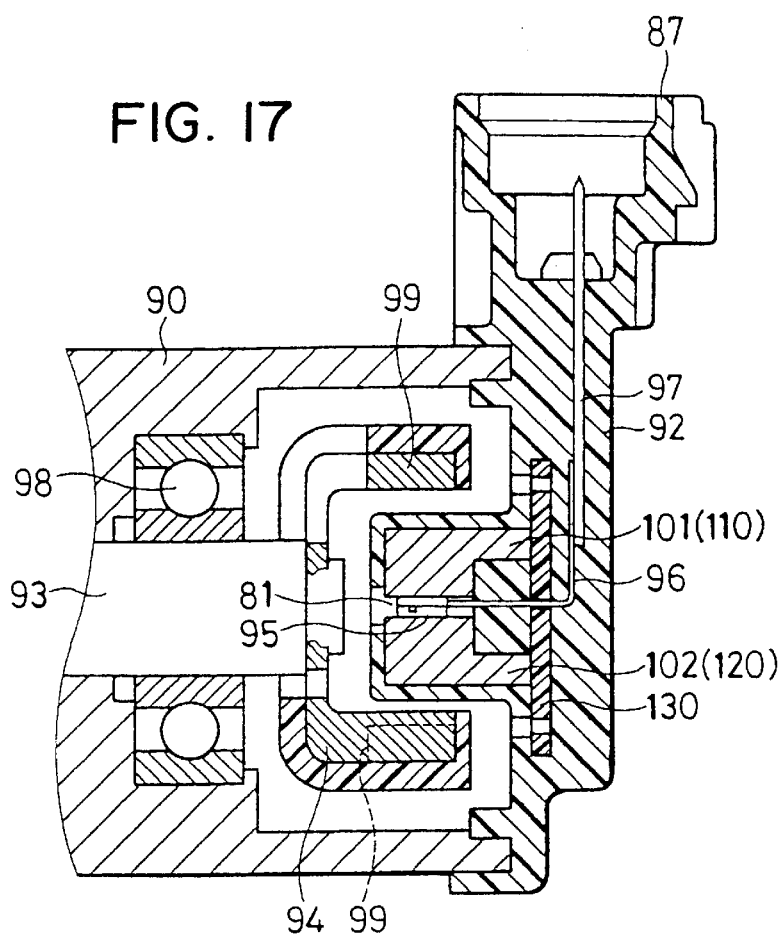
FIG. 17 is a cross-sectional view showing a principal portion of a throttle position sensor (fourth embodiment)

In this case, as shown in FIG. 17, the first stator core 101 can be magnetically separated from the second stator core 102 without the resin spacer 91 in the resin sensor cover 92, thereby attaining the magnetic sensing gap 81. Since the stator core 100 is merely formed by the magnetic plates 110, 120 and the non-magnetic plate 130, the number of parts is reduced, thereby reducing manufacturing cost thereof. Further, since there is no need to use the spacer 91, the first and second stator core portions 101, 102 are accurately positioned, thereby attaining a constant width of the magnetic sensing gap 81 to improve an efficiency of the magnetic circuit.

In the first and second embodiments, the sensor cover 7 is made at the second forming step after the first forming step is completed. However, in the present fourth embodiment, the sensor cover 92 and the stator core 100 are integrally formed simultaneously.

Fifth Embodimenti

Figure 18:
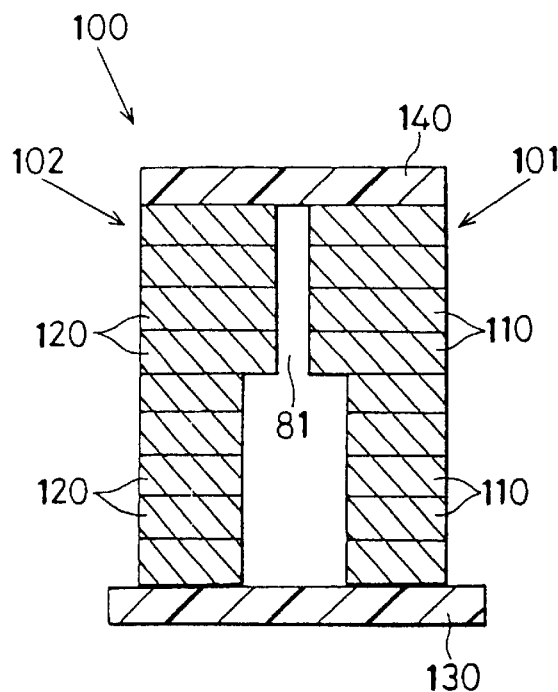
FIG. 18 is a cross-sectional view showing a two-piece stator core (fifth embodiment)
Figure 19:
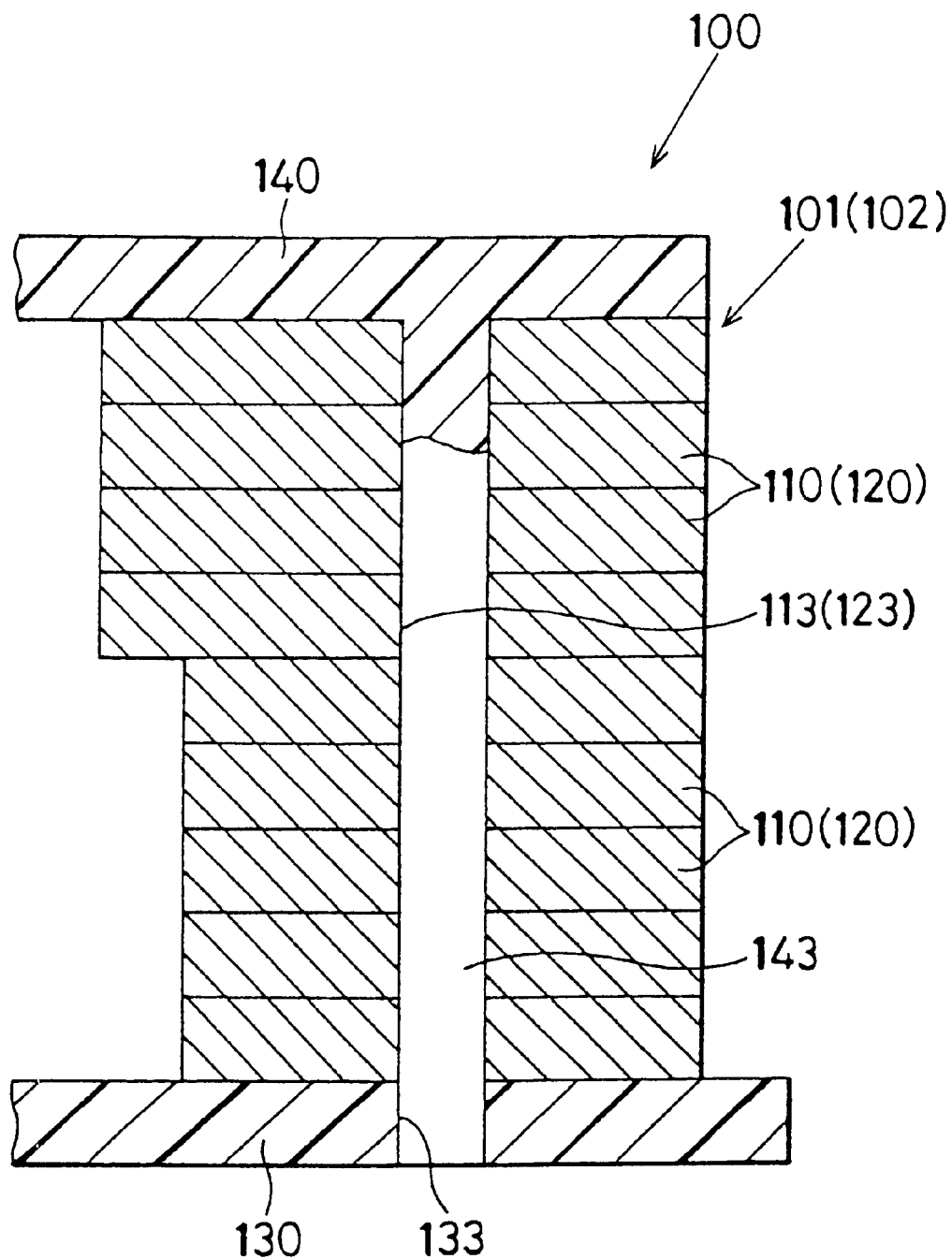
FIG. 19 is a cross-sectional view showing a connection structure of the two-piece stator core (fifth embodiment)
Figure 20:
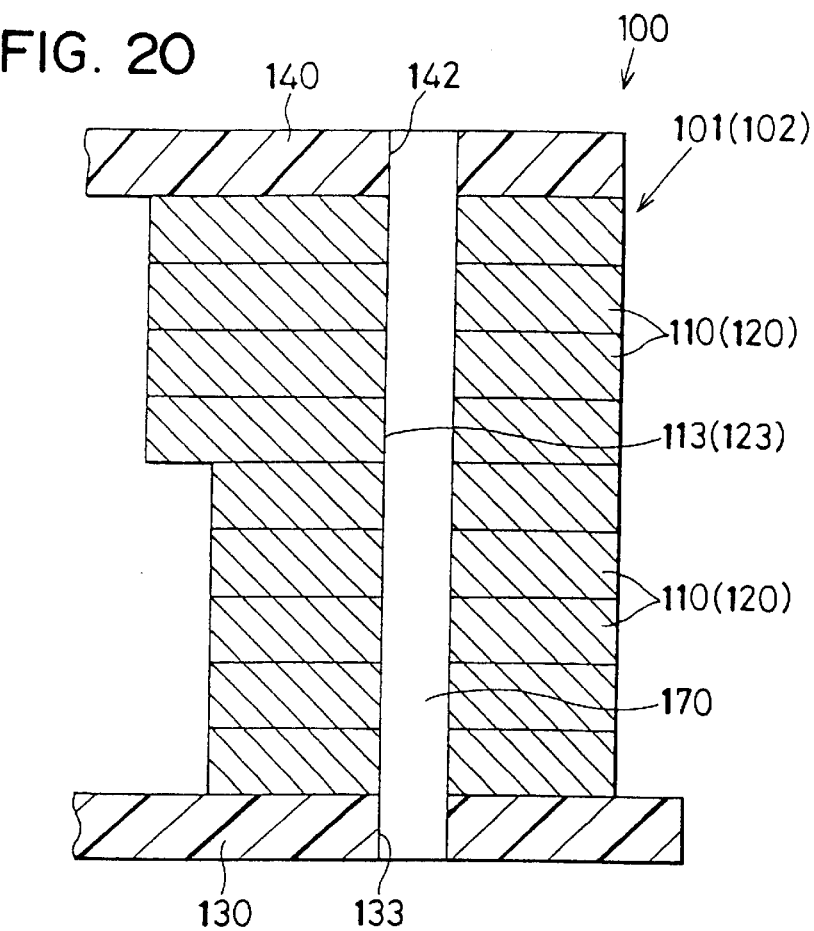
FIG. 20 is a cross-sectional view showing a connection structure of the two-piece stator core (fifth embodiment)

In the fifth embodiment, as shown in FIGS. 18–20, the stator core 100 includes a first stator core 101, a second stator core 102, a bottom non-magnetic plate 130, and a top non-magnetic plate 140. The first stator core 101 is formed by stacking or sintering a plurality of magnetic plates 110, and the stator core 102 is formed by stacking and sintering a plurality of magnetic plates 120. The bottom non-magnetic plate 130 connects the bottom of the first stator core 101 to the bottom of the second stator core 102. The top non-magnetic plate 140 connects the top of the first stator core 101 to the top of the second stator core 102. The bottom and top non-magnetic plates 130 and 140 connect the first stator core 101 to the second stator core 102 to keep the width of the magnetic sensing gap 81.

As shown in FIG. 19, the magnetic plates 110, 120 include a plurality of perforations 113, 123 respectively, for positioning the magnetic plates 110, 120. The bottom non-magnetic plate 130 also includes a plurality of perforations 133 corresponding to the perforations 113, 123. The top non-magnetic plate 140 includes a plurality of vertical pillars 143 penetrating through the perforations 113, 123, 133.

Alternatively, as shown in FIG. 20, the top non-magnetic plate 140 includes a plurality of perforations 142 corresponding to the perforations 113, 123. A plurality of additional pillars 170 penetrates through the 142, 113, 123 and 133. The pillar 170 is made of non-magnetic material such as resin and cylindrically formed.

In this way, the magnetic plates 110, 120 and the non-magnetic plates 130, 140 are positioned in the radial and circumferential directions.

Sixth Embodiment

Figure 21:
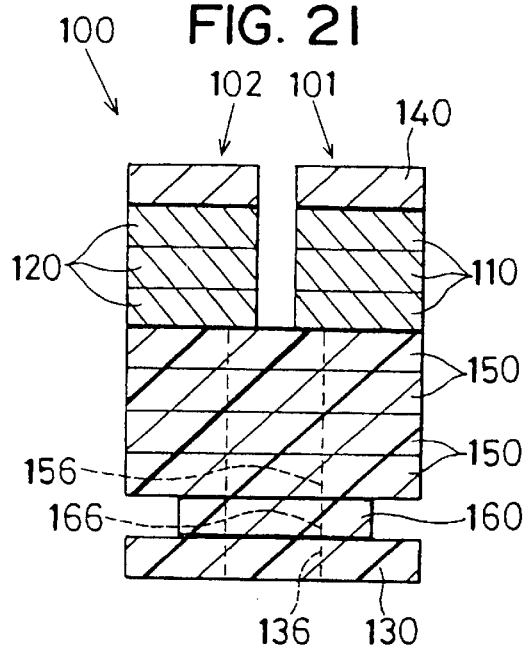
FIG. 21 is a cross-sectional view showing a two-piece stator core (Sixth Embodiment)

In the sixth embodiment, as shown in FIG. 21, a stator core 100 includes a first stator core 101 having three magnetic plates 110, a second stator core 102 having three magnetic plates 120, a bottom non-magnetic plate 130, a top non-magnetic plate 140, four large intermediate non-magnetic plates 150, and a small intermediate non-magnetic plate 160. The intermediate non-magnetic plates 150 and 160 are formed in a disk, and the diameter of the large intermediate non-magnetic plates 150 is larger than that of the small intermediate non-magnetic plate 160. The top non-magnetic plate 140 connects the first stator core 101 to the second stator core 102. The magnetic plates 110, 120 and a rotor core 94 form a magnetic circuit. The large intermediate non-magnetic plates 150 and the small non-magnetic plate 160 improve the efficiency of the magnetic circuit.

The non-magnetic plates 130, 150, 1601 include perforations 136, 156, 166 at the centers thereof, respectively. A lead wire 96 from the Hall IC 95 disposed between the first and second cores 101 and 102 is taken out through the perforations 136, 156, 166.

MODIFICATIONS

In the above-described embodiments, the Hall ICs 31, 32, 61, 62, 95 are used as a non-contact type magnetic sensing element. Alternatively, a Hall element or a magnetic resistive element may be used as a non-contact type magnetic sensing element. The magnetic sensing element such as Hall ICs 61, 62 may be replaced with other element such as thermosensitive element, a motor, an emitter, or a generator as electric parts.

The sensor cover 7 in the above-described embodiments may be replaces with an insulation plate.

In the above-described embodiments, the rotation angle detector of the present invention is applied to a throttle position sensor detecting the rotation angle of the throttle valve 2 and the throttle shaft 3. Alternatively, the rotation angle detector may be applied to a potentiometer detecting the rotation angle of an air-mix door of an automotive air conditioner and the shaft thereof.

In the intake air controller of the above-described embodiments, the actuator 4 drives the throttle valve 2 and the throttle shaft 3. Alternatively, the throttle valve 2 and the throttle shaft 3 may be mechanically operated based on an accelerate stroke through a wire cable and an accelerate lever.

In the first embodiment, the cylindrical permanent magnet 6 generates a magnetic field. Alternatively, a separate type permanent magnet may generate a magnetic field.

In the fourth embodiment, two permanent magnets 99 generate a magnetic field. Alternatively, a cylindrical permanent magnet may generate a magnetic field.

In the third embodiment, when one of the electrostatic capacity of the chip condensers 77, 78 doubles the electrostatic capacity of the chip condensers 75, 76, there is no need to use one of the chip condensers 77, 78.

In the third embodiment, the chip condensers 75–78 are connected to the lead frame 63 by silver paste adhesive. Alternatively, the chip condensers 75–78 may be soldered or brazed to the lead frame 63. In this case, a silver brazing metal (silver-copper-zinc alloy) is appropriate.

What is claimed is:

1. A rotation angle detector comprising:
    a rotor core rotating with a rotary member of which a rotation angle is detected, said rotor core including a magnet generating a magnetic force;
    a non-contact type magnetic sensing element receiving the magnetic force of said magnet to detect the rotation angle of said rotary member;
    an output terminal connected to said non-contact type magnetic sensing element to output an output signal of said non-contact type magnetic sensing element;
    a first resin molded member integrating and supporting said non-contact type magnetic sensing element and said output terminal by resin molding;
    a stator core forming a magnetic circuit with said rotor core said stator core strengthening the magnetic force around said non-contact type magnetic sensing element; and
    a second resin molded member integrating and supporting said stator core and said first resin molded member by resin molding.

2. The rotation angle detector according to claim 1, wherein:
    said stator core includes:
        a first stator core portion provided by stacking a first plurality of magnetic plates in a thickness direction thereof,
        a second stator core portion provided by stacking a second plurality of magnetic plates in a thickness direction thereof, and
        a non-magnetic plate connecting an end surface of said first stator core portion to an end surface of said second stator core portion; and
        said first stator core portion and said second stator core portion defining a magnetic sensing gap having a predetermined width therebetween.

3. The rotation angle detector according to claim 2, wherein said first plurality of magnetic plates stacked to provide said first stator core portion are semi-disk magnetic plates and wherein the second plurality of magnetic plates providing said second stator core portion are also semi-disk magnetic plates.

4. The rotation angle detector according to claim 1, wherein said non-contact type magnetic sensing element includes two element parts disposed side by side in parallel at a 180 degree interval so as to be facing in opposite directions.

5. The rotation angle detector according to claim 1, wherein said non-contact type magnetic sensing element includes a plurality of element parts disposed in series facing a same direction.

6. The rotation angle detector according to claim 1, wherein said magnet includes first and second half arc portions, the first half arc portion having north pole located radially inside and south pole located radially outside and said second half arc portion having south pole located radially inside and north pole located radially outside.

* * * * *